United States Patent [19]
Goto et al.

[11] Patent Number: 4,569,729
[45] Date of Patent: Feb. 11, 1986

[54] ELECTROLYZING METHOD AND ELECTROLYTIC CELL EMPLOYING FLUIDIZED BED

[75] Inventors: Nobutaka Goto, Kashiwa; Nobuyasu Ezawa, Tokyo, both of Japan

[73] Assignees: Chlorine Engineers Corp., Ltd.; Tanaka Kikinzoku Kogyo K.K., both of Tokyo, Japan

[21] Appl. No.: 674,063

[22] Filed: Nov. 19, 1984

[30] Foreign Application Priority Data

Jul. 16, 1984 [JP] Japan .................... 59-146105
Aug. 27, 1984 [JP] Japan .................... 59-128607[U]

[51] Int. Cl.$^4$ ............................ C25D 5/04; C25D 508
[52] U.S. Cl. .................................. 204/23; 204/105 R
[58] Field of Search ................... 204/23, 98, 151, 131, 204/105 R

[56] References Cited

U.S. PATENT DOCUMENTS

| | | | |
|---|---|---|---|
| 3,457,152 | 7/1969 | Maloney, Jr. | 204/131 |
| 3,654,098 | 4/1972 | Backhurst | 204/23 |
| 3,703,446 | 11/1972 | Haycock | 204/23 |
| 3,954,594 | 5/1976 | Recht | 204/151 |
| 4,019,968 | 4/1977 | Spaziante | 204/23 |
| 4,177,116 | 12/1979 | De Nora | 204/98 |
| 4,212,722 | 7/1980 | Avedesian | 204/222 |

*Primary Examiner*—T. M. Tufariello
*Attorney, Agent, or Firm*—Kuhn Muller and Bazerman

[57] ABSTRACT

In an electrolytic cell of the type which includes a cylindrical electrolytic cell main body divided into a main electrode chamber and an auxiliary electrode chamber by a diaphragm, and having main electrode particles in the main electrode chamber, which are maintained in the fluidized state by an electrolyte supplied to the main electrode chamber, an improvement is disclosed wherein an electrolyte supply port and an electrolyte discharge port are provided to enable flow of electrolyte through said cell to maintain the fluidized state of said particles, and a porous auxiliary electrode is provided in contact with the diaphragm on the side thereof facing said auxiliary electrode chamber, to facilitate flow of gas generated on the auxiliary electrode in the direction of the auxiliary chamber.

16 Claims, 7 Drawing Figures

ELECTROLYZING METHOD AND ELECTROLYTIC CELL EMPLOYING FLUIDIZED BED

BACKGROUND OF THE INVENTION

This invention relates to an electrolyzing method and an electrolytic cell using a fluidized bed for various electrochemical reactions such as recovery or refining of various metals, electroplating to granules and decomposition of organic compounds and/or cyanic compounds.

Fluidized bed electrolysis employing fluidized electrode particles, such as metal particles, for the recovery of metals in solution or electroplating to granules has been known (U.S. Pat. Nos. 3,457,152 and 4,212,722). Prior to the development of this fluidized bed electrolysis, the following methods had been employed to recover metals in solution.

(a) Adding a reducing agent to the metal containing solution to deposit metals directly from the solution.

(b) Introducing the solution containing metal ions and/or metal cyanide complex ions to a tower filled with ion exchange resins to fix the metal ions, metal-cyanide complex ions on the ion exchange resins.

(c) Electrolyzing solution at a low current density in an electrolytic cell to deposit metals on a cathode.

These methods, however, have the following disadvantages. Although metals can be recovered thereby from the solutions, method (a) has the disadvantage that since a large quantity of solution must be employed, the reaction requires a long time and the operation cost is high. Although the operation of method (b) itself is easy, the construction cost of the equipment and operation cost of chemicals for regeneration are high. Method (c) is suitable for waste solutions containing high concentrations of gold, but a reduced current density is necessary to obtain an economical current efficiency when the waste solution has a low gold concentration. This makes the electrolytic cell larger and of high construction cost. Further, since a low current density operation is utilized, the metal is deposited as an extremely good plating so that, in practice, it is necessary to use a parting agent for redissolving the metal because the usual method of removing the metal from the cathode is difficult to use.

These methods have been applied, not only for the recovery of metal from solutions, but also to processes in which metal containing a small quantity of impurities is refined to high purity metal or a desired metal is electro-plated onto granules, and similar disadvantages have been found therein.

The fluidized bed electrolysis technique has been developed in order to overcome the above disadvantages.

The technique has enabled metals to be deposited on electrode particles at a high current efficiency and a low electrolytic voltage by accommodating the fine electrode particles in an electrode chamber in which an electrolyte is electrolyzed, and fluidizing the particles by the electrolyte alone, or the electrolyte and supply gas.

However, since in conventional fluidized bed electrolysis, a plate-like electrode is employed as an opposite electrode, the following disadvantages are pointed out. A gas generated in an opposite electrode chamber comes between the opposite electrode and a diaphragm separating the two electrode chambers from each other, making the electrolysis condition unstable by raising the electrolytic voltage, or bending the diaphragm to damage it. Moreover, if the degree of curvature of the diaphragm is excessive, it prevents fluidization of the particles and makes the electrolysis condition more unstable.

SUMMARY OF THE INVENTION

An object of this invention is, in metal recovery, metal refining, electroplating of granules, decomposition of organic and/or cyanic compounds and the like, to obtain stable electrolysis conditions to electrolyze an electrolyte effectively.

Another object of this invention is to protect a diaphragm separating an anode chamber from a cathode chamber in an electrolytic cell.

The present invention relates to an improved process for electrolyzing an electrolyte by supplying electrolyte to a main electrode chamber of an electrolytic cell main body separated from an auxiliary electrode chamber of the electrolytic cell main body by a diaphragm, while maintaining main electrode particles in the fluidized state by the flow of said electrolyte through said main electrode chamber, and providing an electrolyzing potential across said cell comprising; providing a porous auxiliary electrode in contact with said diaphragm on the side thereof facing said auxiliary electrode chamber, to facilitate flow of gas generated on the surface of the auxiliary electrode in the direction of said auxiliary chamber.

Also provided in accordance with the present invention is an improved electrolytic cell of the type which includes a cylindrical electrolytic cell main body divided into a main electrode chamber and an auxiliary electrode chamber by a diaphragm, and having main electrode particles in the main electrode chamber, which are maintained in the fluidized state by an electrolyte supplied to the main electrode chamber comprising; an electrolyte supply port and an electrolyte discharge port provided, to enable flow of electrolyte through said cell to maintain the fluidized state of said particles, and a porous auxiliary electrode in contact with the diaphragm on the side thereof facing said auxiliary electrode chamber, to facilitate flow of gas generated on the auxiliary electrode in the direction of said auxiliary chamber.

DETAILED DESCRIPTION OF THE INVENTION

Figure 1:
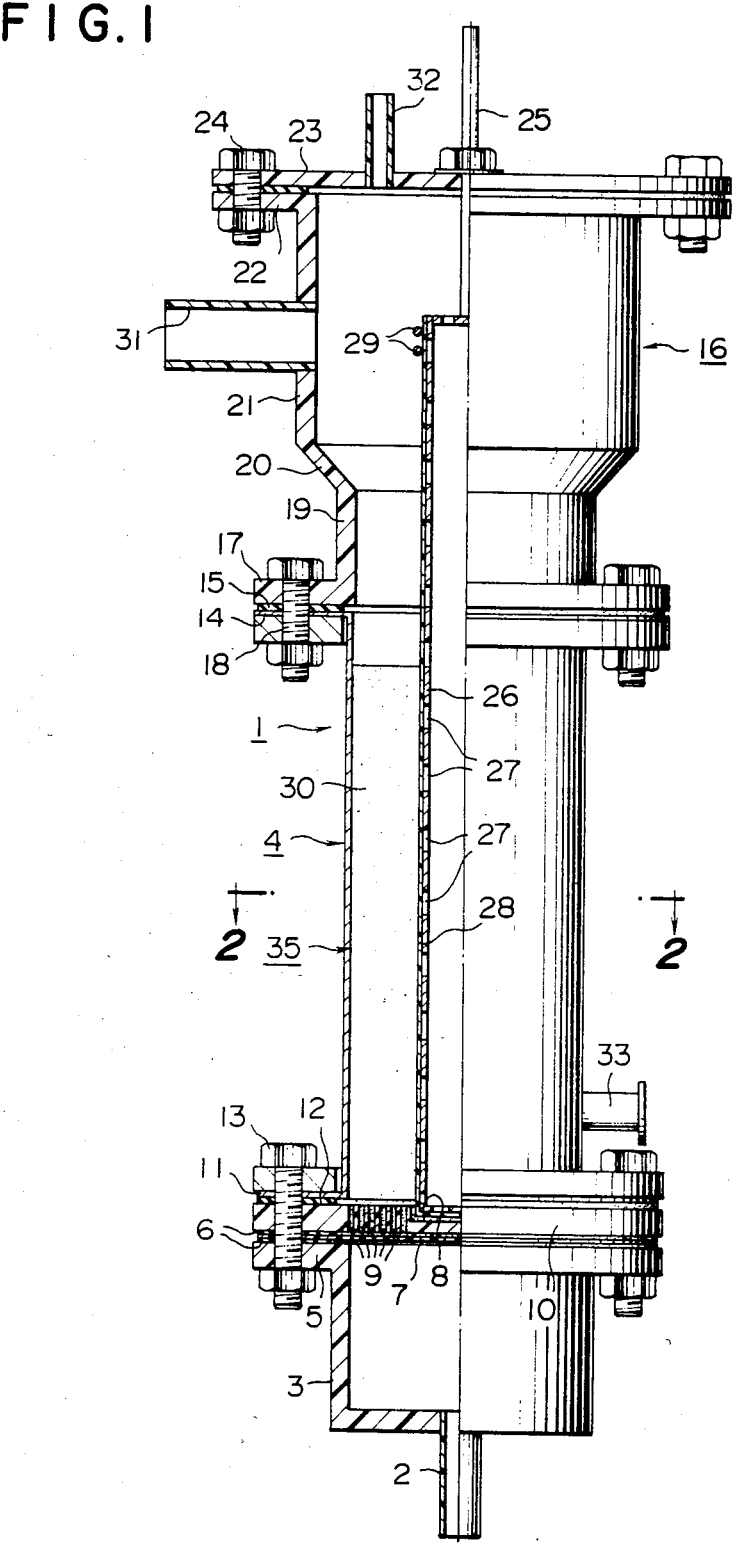
FIG. 1 is an elevation view partially in section, of a first embodiment of the electrolytic cell according to the present invention.

The process and the electrolytic cell according to the present invention can be applied mainly to such purposes as the recovery and refining of metals, electroplating onto granules and decomposition of organic compounds and/or cyanic compounds.

When the recovery and the refining of metals, or the electroplating of granules is performed, electrolysis is carried out under the condition that a cathode chamber serves as a main electrode chamber, and an anode chamber serves as an auxiliary electrode chamber. When decomposition of organic compounds and/or cyanic compounds is carried out, electrolysis is operated under the condition that the anode chamber serves as the main electrode chamber, and the cathode chamber serves as the auxiliary electrode chamber. Accordingly, in the case of the recovery of metals or the like, main electrode particles, an auxiliary electrode, a main electrode of the main electrode chamber, act as cathode particles, an anode and a cathode, respectively, and, in the case of the decomposition of the organic compounds and/or cyanic compounds, act as anode particles, the cathode and the anode, respectively.

Metals such as gold, silver, copper and the like, or their oxides, or sulfides, or alloys, or electro-conductive nonmetals such as graphite, activated carbon and the like can be employed as the cathode particles. Granules such as graphite, glass ceramics and the like, coated with metals such as gold, silver, copper, nickel, lead and the like can be also employed as cathode particles. Granules such as graphite, glass, ceramics and the like, or titanium coated with precious metals, precious metal oxides, lead and the like, which are resistant to electrolyte, can be employed as the anode particles. The particle size of the cathode particles and the anode particles is about 0.05–3.0 mm, and preferably, 0.1–0.5 mm. Conventional materials, such as graphite, stainless steel, titanium coated with platinum or precious metal oxides, ferrite and the like, can be employed as the cathode and the anode.

The diaphragm separating the main electrode chamber from the auxiliary electrode chamber may be either porous or non-porous, provided ions can pass therethrough. The pore size of a porous diaphragm should be smaller than the size of the main electrode particles, preferably 10–100μ. The diaphragm may be prepared from a non-conductive polymeric compound, such as nylon, polyethylene, polypropylene, polytetrafluoroethylene, or a non-conductive inorganic compound. The diaphragm may have ion exchange groups.

The auxiliary electrode must be porous so that gas generated between the electrode and the diaphragm will not collect between the electrode and diaphragm but will pass through the electrode for discharge from the chamber. Further, the electrode should be made to conform with and be in contact with the diaphragm. An expanded metal, a plate perforated with apertures, or other porous material may be employed as the porous auxiliary electrode.

Electrolysis occurs as the electrolyte is supplied to the main electrode chamber of the electrolytic cell comprising the above components. The electrolyte used may be selected in accordance with the purpose of electrolysis. In the case of the recovery of metals, a solution containing at least a portion of various metals, including, for example, precious metals, such as gold, platinum, silver and the like, contaminant or pollution metals, such as cadmium, chromium and the like, and other metals, such as zinc, garium, bismuth, alminium and the like, and preferably, an electroplating waste solution, or an etching solution, is employed.

In the case of the refining of metals, a solution containing a metal having relatively high purity to be refined and a small amount of impurities is employed. In the case of the electroplating of granules, a solution containing a metal to be plated is employed.

The metals to be refined should not be limited. In theory, all metals can be refined by the present invention. However, if a potential difference between a metal to be refined and an impure one is small, the refining by electrolytic cell is not easy. In this case, electrolysis should not be continued in the course of refining because, as electrolysis proceeds, the concentration ratio of the impure metal becomes high.

The metals to be plated onto the granules should not be limited in theory, but the precious metals such as gold, silver, platinum are preferable.

The main electrode particles are kept in the fluidized state by the flow of the electrolyte supplied into the electrolytic cell. The flow-rate pressure of electrolyte is reduced by an increase of a horizontal cross-section area of the chamber to maintain the fluidized state. The term "fluidized state" refers to the state of the electrolyte solution and main electrode particles while the particles stick to and separate from each other under the flow condiditons of the solution. If the flow rate of electrolyte is insufficient, the pressure drop through the cell is increased because metal is deposited so much on the unfluidized particles in the cathode chamber. And finally, the current between anode and cathode may be shortened. On the contrary, if the flow ratio is exceeded, the particles cannot get the sufficient contact to cathode nor be maintained in the fluidized state in the cathode chamber. Therefore, the electrolytic reaction cannot take place.

When operated under the above conditions, electrolysis with low electrolytic voltage and high current efficiency is obtained because the main electrode particles in the fluidized state serve to make the surface area of the main electrode extremely large, thus reducing the current density. Moreover the main electrode particles collide with each other, making an electric double layer unstable.

A desired metal can be deposited selectively by using the difference in the different metals' deposit potentials. This is convenient for refining of the metal.

Since the auxiliary electrode is in contact with the diaphragm, and is porous, the increase of the electrolytic voltage or damage of the diaphragm by the entry or collection of the generated gas between the auxiliary electrode and the diaphragm can be prevented.

In the case of the recovery or refining of metals, and the electroplating of granules, cathode particles having the surfaces thereof coated with the metal are recovered from the electrolytic cell as they are produced. In general, the electroplated granules obtained by the process of the invention can be used without further processing. In the case of the recovery or the refining of metals, it is generally necessary to separate the deposited metal from the cathode particles unless they are the same material.

Conventional separation methods may be employed for this purpose. For example, when the metal such as gold or platinum, is separated from the cathode particles by the dry separation method, the following procedure may be employed. After the granules coated with gold or platinum are fused, oxygen gas or chlorine gas is blown through the molten mass so that the metals other than gold and platinum are vaporized and discharged to the atmosphere as the oxides or chlorides, and glass or the like floats on the fused metals as slag to be separated. Upon cooling and solidification, gold or platinum containing few impurities can be obtained. When an alloy is deposited on the cathode particles from an electrolyte solution containing precious metals and base metals, the precious metals can be separated by a conventional wet separation method after the alloy is redissolved. The redissolved alloy solution contains nothing other than the metal elements, being free, for example, of organics. Since the concentration of the solution is high and the amount of the solution is small, economical recovery can be performed.

When the process of the invention is used for the decomposition of organic compounds and/or cyanic compounds, no separation step is necessary because nothing is deposited on the anode particles.

Organic compounds employed in this invention should not be limited. Aliphatic and aromatic hydrocarbons, alcohols, ketones, amines, esters, carboxylic acids etc. can be employed without limitation. The organic compounds dissolved in electrolyte are oxidatively decomposed on the anode to be decomposed to carbon dioxide and water. If nitrogen is contained in the starting organic compounds, nitrogen gas and/or ammonium ion are also produced.

In waste solutions, especially in electroplating waste solutions, cyanide ions are usually contained other than metals. If this solution is supplied to the present electrolytic cell, the metals are deposited on cathode particles and the cyanide ions are decomposed on anode to produce nitrogen, ammonium ion and carbon dioxide.

The current efficiency in connection with the recovery of metals according to the present invention is not less than 10%. The recovery rate of the metal from solution by a single operation, depends on the amount of metal in solution and the electrolysis time, and is nearly 100% at low electric power if the metal concentration is low, and is not less than 90%, even if the concentration is relatively high. In the latter case, metals can be recovered nearly quantitatively by circulating the solution.

Alternate preferred embodiments of this invention will be described with reference to the accompanying drawings. Although the present invention will be explained with the electrolytic cell having the cathode as the main electrode, and the anode as the auxiliary electrode for the recovery and refining of metals, and the electroplating of granules, the present invention is not intended to be limited to these embodiments.

Figure 2:
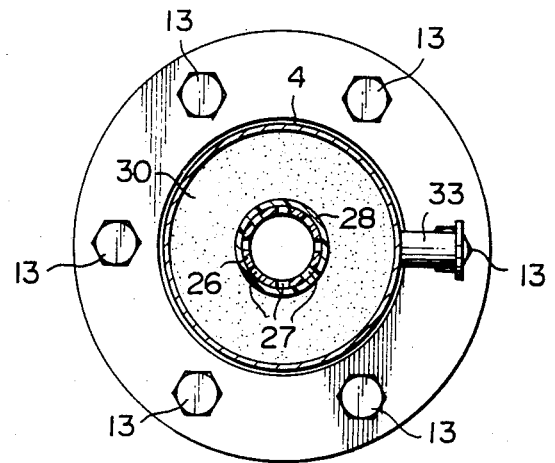
FIG. 2 is a transverse cross-sectional view taken along line 2—2 of FIG. 1.
Figure 3:
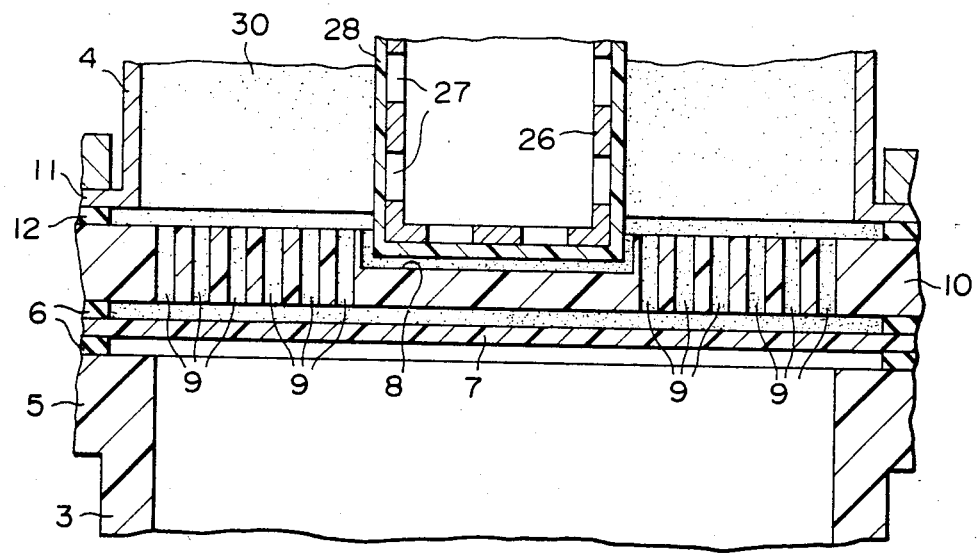
FIG. 3 is an enlarged vertical-sectional view showing the lower end of FIG. 1.

Referring now to the drawings wherein like reference numerals denote like parts, there is shown in FIGS. 1, 2 and 3 an exemplary embodiment of an electrolytic cell according to the present invention.

An electrolytic cell main body 1 comprises a generally dish-shaped bottom end 3 provided with a downward-extending solution supply port 2 and a cylindrical cathode 4, of which both upper and lower ends are respectively flared outwardly. A porous membrane 7, is disposed over the top open end of the bottom end 3 with the periphery thereof interposed between a pair of gaskets 6 is placed on a peripheral flange 5 of the bottom end 3. A solution dispersing plate 10 provided with a recess 8 on the upper central portion thereof and having a plurality of vertical apertures 9 therethrough except in the area of the recess 8 and the periphery thereof is mounted on flange 5. The outwardly flared portion 11 of the lower cathode 4 is in contact with the periphery of the solution dispersing plate 10 through the intermediary of a gasket 12, and is tightly secured by bolts 13 to the bottom end 3.

A flange 17 about the periphery of the lower portion of a fluidized particle dispersion-preventing tower 16 is mounted over the outwardly flared portion 14 of the upper end of the cathode 4 through the intermediary of a gasket 15 and is secured tightly thereto by bolts 18. The fluidized particle dispersion-preventing tower 16 consists of, the flange 17, a small-diameter part 19 extending upwardly therefrom, a tapered part 20, a large-diameter part 21 and an upper portion outward flange 22. A disc-shaped cover body 23 is attached tightly to the upper portion flange 22 by bolts 24. An elongated cylindrical anode 26 having a plurality of apertures 27 for gas discharge is suspended from the lower central portion of the cover body 23 through the intermediary of an anode terminal 25, with the lower end thereof extending downwardly to the vicinity of the recess 8 of the dispersion plate 10. A cylindrical diaphragm 28 having an open top end, made of a material such as tetrafluoroethylene which substantially prevents permeation of electrolyte, is disposed about and in contact with the lower and side surfaces of the anode 26. The upper end of the diaphragm 28 is secured to the anode 26 by a pair of 0-rings 29.

Cathode particles 30 are provided in the chamber 35 formed between the diaphragm 28 and the cathode 4 in the electrolytic cell main body 1 and are maintained during operation in a fluidized state by virtue of the flow of electrolyte therethrough. Numeral 31 denotes an electrolyte discharging port provided on the side surface of the large-diameter part 21 of the fluizided particle dispersion-preventing tower 16, numeral 32 denotes a generated gas discharge port provided in cover body 23 and numeral 33 denotes a cathode particles discharging port provided on the lower side surface of the cathode 4.

An embodiment of the electrolysis process of the present invention using the electrolytic cell shown in FIGS. 1, 2 and 3 will be explained hereinafter as an example.

A metal containing solution such as a metal containing waste solution is supplied to the electrolytic cell main body 1 through the solution supply port 2. An aqueous solution is generally employed, but an organic solution such as an alcohol used in solvent extraction methods may be also employed. The solution is introduced to the cathode chamber 35 through the pores of the porous membrane 7 and the apertures 9 of the solution dispersing plate 10. The solution has the role of maintaining the cathode particles 30 in the fluidized state. Since the flow-rate of the solution passing through the cathode particles 30 is decelerated when it enters the tapered part 20 of upper tower 16 by virtue of which the cathode particles 30 are separated from the solution, uniform laminar flow can be obtained in the cathode particle region. Upon imparting the desired voltage and current to the electrodes metal ions in the solution are electrolytically reduced on the cathode particles 30 to be deposited thereon as metal atoms. Hydrogen generated by the decomposition of water as a side reaction is discharged through the generated gas discharging port 32. Anions such as cyanide ions, chlor ions, sulfate ions and the like contained in electrolyte in the cathode chamber permeate the diaphragm to the anode chamber. Depending on electrolysis conditions, the decomposition of these anions may take place on the anode. However, in the ordinary conditions, oxygen is generated on the surface of the anode 26 by the usual water electrolysis reaction. Since the oxygen, as it is generated on the surface of the anode 26 between the diaphragm 28 and the anode 26, passes through the apertures 27 thereof and then is discharged through the generated gas discharging port 32 by virtue of apertures in the upper surface of the anode 26, the generated gas does not collect. Accordingly, increase of the electrolytic voltage or curvature of the diaphragm to prevent the fluidization of the cathode particles and thus make electrolysis conditions unstable, or damage of the diaphragm does not take place. The solution having a decreased metal ion concentration after electrolysis overflows through the electrolyte discharge port 31 to be discharged out of the electrolytic cell.

As the electrolysis proceeds, the metal is deposited on the cathode particles 30. As the quantity of the deposited metal increases, the cathode particles 30 becomes heavier and accumulate in the lower portion of the cathode chamber 35, while the cathode particles coated with a relatively small quantity of the metal will tend to accumulate in the upper portion of the cathode chamber 35. Cathode particles coated with a sufficient quantity of the metal which have accumulated in the lower portion of the cathode chamber are discharged from the electrolytic cell through the cathode particle discharge port 33. Cathode particles corresponding to the quantity of discharged ones are supplied to the cathode chamber from the upper open end of the upper tower 16 after taking away the cover body 23. This makes it possible to supply the cathode particles and to discharge them without the cessation of the operation, and a continuous operation covering a long period can be attained.

In this electrolytic process, it is desirable that electrolysis should be performed under the following conditions so that potential can be applied to the cathode particles in the fluidized bed efficiently and a metal can be deposited on the particles at a high current efficiency and a low electrolytic voltage.

Cathode current density: Not more than 30 A/dm$^2$ (preferably not more than 10 A/dm$^2$)

Anode current density: Not more than 20 A/dm$^2$ (preferably not more than 5 A/dm$^2$)

Current concentration within fluidized bed: Not more than 30 A/l-fluidized bed (preferably not more than 10 A/l-fluidized bed)

Fractional void of fluidized bed (volume of electrolyte/volume of electrolyte and cathode particles): 40 to 90% (preferably 60 to 75%)

If the cathode current density and the anode current density exceed 30 A/dm$^2$ and 20 A/dm$^2$, respectively, the voltage becomes unnecessarily high and the current efficiency is reduced. If the current density within the fluidized bed exceeds 30 A/l-fluidized bed, the voltage rises and, in addition, plugging takes place. If the fractional void of the fluidized bed exceeds 90%, the voltage rises; if it is below 40%, plugging takes place in the vicinity of the solution supply port. Therefore, it is desirable that the electrolysis conditions should be maintained within the above-given ranges.

Since, as electrolysis proceeds, the size of the cathode particles becomes larger by virtue of the deposition of the metal thereon and changes occur in the fluidization conditions (height of the fluidized bed, fractional void of the fluidized bed and pressure loss in the fluidized bed). To reduce these adverse effects, the fluidized bed part of the electrolytic cell should preferably be designed as follows. The height of the fluidized bed should be at least 1.2 times, and preferably 1.4 times, that of the initial fluidized bed, and the cross-sectional area of the fluidized particle dispersion-preventing tower should be at least 1.5 times, and preferably at least 2 times, that of the electrolytic cell main body. These design criteria are employed to ensure the continual fluidization of the cathode particles and to prevent entrainment of the particles in the electrolyte solution to be discharged. The construction ensures that a metal can be deposited on the cathode particles until the particles becomes at least twice their initial size.

Figure 4:
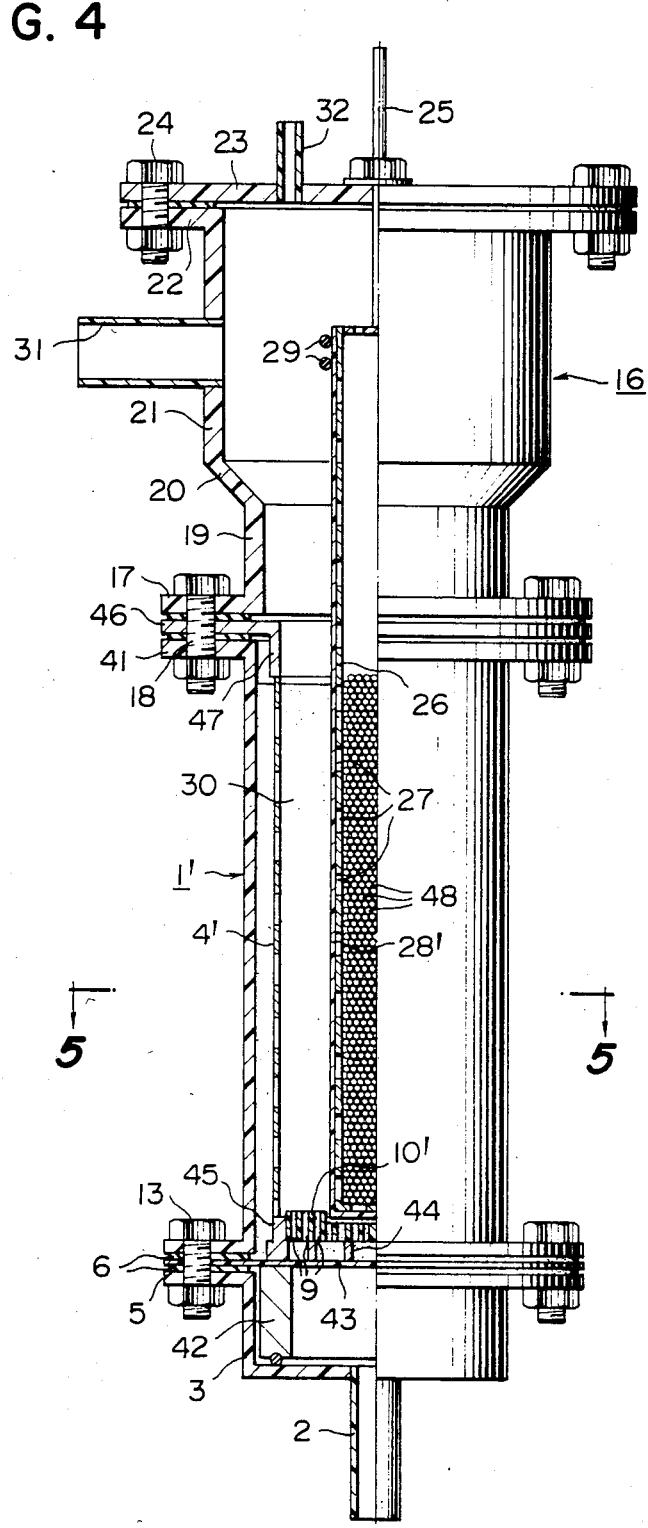
FIG. 4 is an elevation view, partially in section, of a second embodiment of an electrolytic cell according to the present invention.
Figure 5:
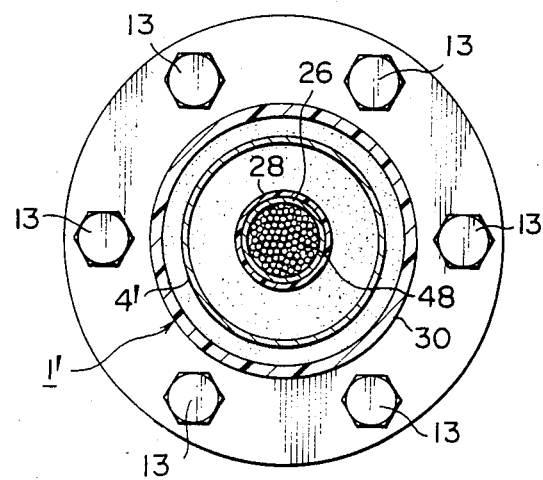
FIG. 5 is a transverse cross-sectional view taken along line 5—5 of FIG. 4.
Figure 6:
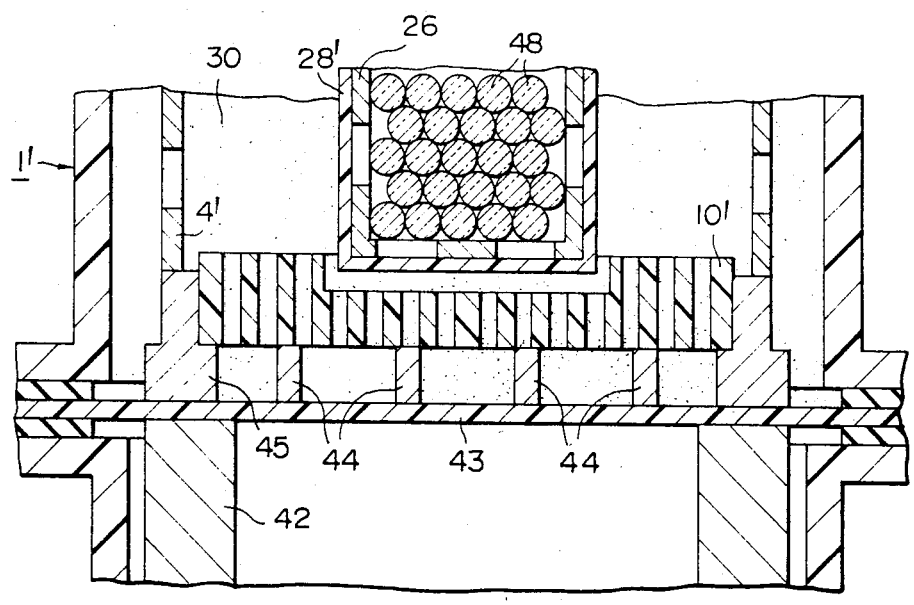
FIG. 6 is an enlarged vertical-sectional view showing the lower end of FIG. 4.

In FIG. 4 is shown another embodiment of the electrolytic cell according to the present invention. Since the electrolytic cell of this embodiment relates to an improvement of the cell of the embodiment shown in FIGS. 1, 2 and 3, the parts shown in FIG. 4 which are the same as those shown in FIGS. 1, 2 and 3, will be denoted by the same numerals and further description thereof will be omitted.

The electrolytic cell main body shown generally as 1' comprises a cylindrical body having an open top and a flange 41 provided about the periphery of the top end thereof. A cathode supporting cylinder 42 is provided in the bottom end 3 of the main body 1', and a doughnut-shaped cathode lower portion frame 45 which is provided therein with a grid-shaped supporting piece 44 is mounted on the cathode supporting cylinder 42 through the intermediary of a porous membrane 43. A porous cylindrical cathode 4' is mounted uprightly on the top end of the cathode lower portion frame 45 by such as welding, and a solution dispersing plate 10' is provided on the inner edge of the cathode lower portion frame 45. On the upper end of the cathode 4' is connected, by such as welding, the lower end of a cylindrical cathode upper portion frame 47 having with an outwardly flared portion 46 on the upper end thereof. The peripheral edge of the outer flared portion 46 is aligned with the peripheral edge of the flange 41.

A porous diaphragm 28' made from nylon or the like, which permits permeation of the electrolyte relatively freely but does not permit passage of the cathode particles, is provided in contact with the lower and side surfaces of the anode 26 in which a plurality of granules 48 such as glass beads and graphite particles are charged.

By supplying the metal containing solution to the electrolytic cell through the solution supply port 2, the metal plated electrode particles 30 are recovered in a similar manner as described hereinabove in connection with the first embodiment. In this electrolytic cell, the solution is supplied under increased pressure to the cathode chamber separated from the anode chamber by the porous membrane 43. If the granules 48 are not present in the anode chamber, the electrolyte permeates through the porous membrane 43 from the cathode chamber to the anode chamber and flows through the anode chamber which has lower resistance without contacting the cathode particles 30 and metal cannot be recovered from the electrolyte solution. However, according to the present embodiment, since the resistance in the anode chamber is increased by the presence of a plurality of the granules 48 to prevent the electrolyte circulation therethrough, sufficient contact of the electrolyte with the cathode particles 30 is maintained so that the metal can be recovered at a high yield.

Figure 7:
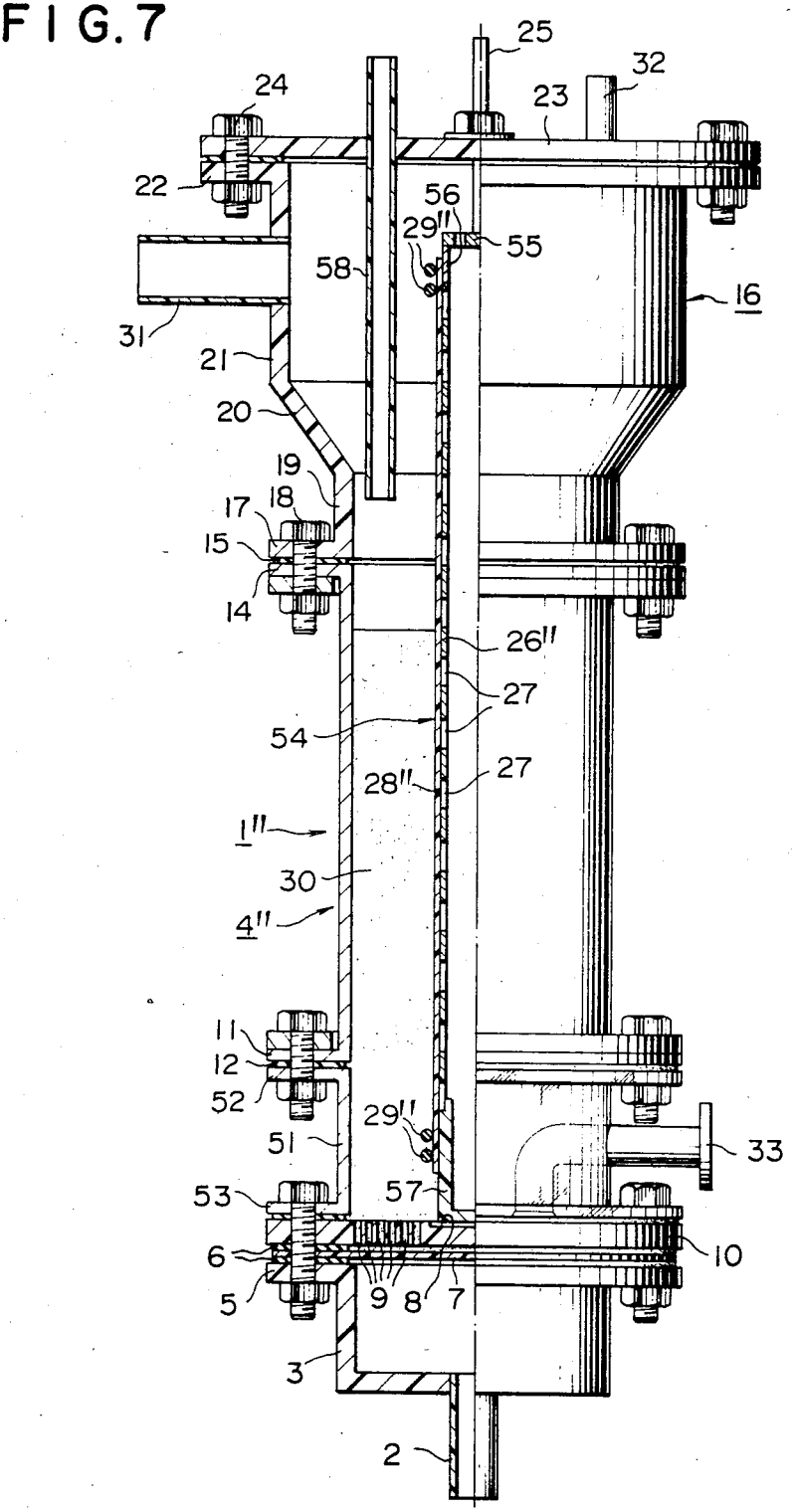
FIG. 7 is an elevation view, partially in section, of a third embodiment of an electrolytic cell according to the present invention.

In FIG. 7 is illustrated of a third embodiment of the electrolytic cell according to the present invention. Since an electrolytic cell of this embodiment relates to an improvement of the cell of the embodiment shown in FIGS. 1, 2 and 3, a description of the same elements as those of the embodiment shown in FIGS. 1, 2 and 3 will be omitted but the same reference numerals will be used to denote such like parts.

An electrolytic cell main body shown generally as 1" comprises a dish-shaped bottom end 3 and a short cylindrical transparent body 51 made of acrylic resin or the like and a cylindrical cathode 4". The upper and lower flanges 52, 53 of the transparent body 51 are connected with the lower flange 11 of the cathode 4" and the peripheral flange 5 of the dish-shaped bottom end 3 through the intermediary of a gasket 12 and a solution dispersing plate 10 respectively.

An anode body 54 comprises a porous disc body 55 connected with the lower portion of an anode terminal 25, a short-cylindrical body 56 connected, by such as welding, with the lower periphery of the disc body 55, an anode 26" connected with the lower portion of the short-cylindrical body 56, and a cup-shaped body 57 connected with the lower portion of the anode 26". A cylindrical membrane 28" is secured to the disc body 55 and the cup-shaped body 57 of the anode body 54 by two pairs of O-rings 29" positioned at the upper and lower portions of the membrane 28". Numeral 58 denotes a cathode particle supply port of which the lower end reaches the inner port of a small-diameter part 19 of a fluidized particle dispersion-preventing tower 16.

By supplying the metal containing solution to the electrolytic cell through the solution supply port 2, the metal is recovered in a similar manner as described hereinabove in connection with the first embodiment. As electrolysis proceeds in this electrolytic cell, metals deposit on the cathode particles 30. The cathode particles 30 become heavier as the deposit is increased to gather in the lower portion of the cathode chamber. In the upper portion of the cathode chamber, there are the cathode particles having relatively small amount of deposit.

In this embodiment, since the transparent body 51 is connected with the lower portion of the cathode 4, the electroplated state of the cathode particles 30 gathering in the lower portion of the cathode chamber can be viewed so that the cathode particles can be taken out of the electrolytic cell when desired by opening a valve of the cathode particle discharging port 33 with the electrolyte. In this case, the amount of the cathode particles in the cathode chamber can be maintained generally constant by supplying the same amount of new cathode particles as that of the discharged particles.

Although, in this embodiment, the electrolytic cell main body comprises the cathode and the transparent body, it will be evident that various modifications thereof may be possible. For example, the cathode can be positioned in the cathode chamber and all outer walls of the electrolytic cell main body could be transparent, or the outer wall of the electrolytic main body could be made to act as the cathode and a peephole is provided at the lower portion of the cathode.

According to the present invention, when the metals are recovered from the solution, or metals are refined or granules are plated and organic compounds and/or cyanic compounds in the solution are decomposed, since the fluidized bed electrolytic cell is employed to make the surface area of the main electrode extremely large, electrolysis can be performed effectively at low current density. Moreover, since the auxiliary electrode is porous and is in contact with the diaphragm, generated gas does not collect between the auxiliary electrode and the membrane. Accordingly, undesirable electrolysis conditions such as the increase of the electrolytic voltage, the prevention of the fluidization of the main electrode particles by the curvature of the membrane, and the like are avoided and damage of the membrane is prevented.

The following Examples illustrate the present invention but should not be construed to limit the invention.

EXAMPLE 1

Gold was recovered from a gold-plating waste solution using the fluidized-bed electrolytic cell of FIG. 1. The sizes of the members of the electrolytic cell were: height of the electrolytic cell main body, 113.5 cm; inner diameter thereof, 14.0 cm: height of the porous anode, 105 cm; diameter thereof, 4.9 cm; height of the fluidized particle dispersion-preventing tower, 35 cm; and outer diameter of the large-diameter port thereof, 21 cm. The electrolytic cell main body and the fluidized particle dispersion-preventing tower were made of acrylic resin, the anode was made of platinum-coated titanium, the cathode particles were graphite particles coated with gold of sizes between 0.1 to 0.15 mm, the non-porous chamber-separating diaphragm was made of polytetrafluoroethylene, and the solution-dispersing plate was made of polyvinyl chloride resin.

The conditions of the test solution were: pH value, 4.1; total quantity of organic carbon (TOC), 15.0 g/l; quantity of silicon dioxide, 56 mg/l; total quantity of phosphorus, 1.6 mg/l. The concentration of the ions of each component was as shown below. The solution was diluted with water so that the concentration of the gold was adjusted to 1650 ppm before it was supplied to the electrolytic cell.

| Au | 2580 ppm | Ni | 25 ppm |
|---|---|---|---|
| Na | 51 ppm | K | 13300 ppm |
| $CN^-$ | 1000 ppm | $SO_4^{2-}$ | 43000 ppm |
| $Cl^-$ | 530 ppm | | |

The waste solution containing gold, adjusted in the above manner, was supplied to the electrolytic cell at a flow rate of about 2.8 l/min, and was electrolyzed under conditions of an anode current density of 2.60 A/dm$^2$, a cathode current density of 1.0 A/dm$^2$, an inner-fluidized bed current concentration of 10.7 A/l of the fluidized bed, and a fractional void of the fluidized bed of cathode particles of 70%. As a result, the electrolytic voltage was between 2.1 to 2.5 V, the average current efficiency was 38%, and the concentration of the gold in the waste solution at the outlet of the electrolytic cell was 3 ppm. The concentration of nickel in the waste solution was not reduced.

EXAMPLE 2

Plating of copper particles (granular particles having an average size of 100μ) with gold was performed using the following method and the same electrolytic cell as described in Example 1, except that a nylon net having small apertures the size or diameter of which were around 50μ was employed as a chamber-separating diaphragm, and a plurality of glass beads of a size or diameter of 0.3-0.6 mm were charged in the anode chamber.

5 kg of degreased copper particles that were washed by water, then by hydrochloric acid and again by water to eliminate contamination and an oxide layer on the surface thereof, were charged to the cathode chamber. Gold plating of the copper particles was performed under the following conditions.

| Gold Plating Conditions | |
| --- | --- |
| Plating Solution: | Autronex C containing 8 g/l of gold (Acidic cyan plating solution made by Nippon Electroplating Engineers K.K.) |
| Impurity: | Copper 40 ppm |
| Quantity of Plating Solution: | 50 l |
| Current: | 45 A |
| Voltage: | 4 V |
| Plating Temperature: | 50° C. |
| Plating Time: | 60 min. |
| Flow Rate (Upper velocity): | 0.3 cm/sec |

All the copper particles became gold-colored in about ten minutes.

The gold-plated copper particles were separated from the plating solution, washed by water sufficiently, filtered and dried to yield particles (Au/Cu particles) coated with a 0.1 l gold-plating layer. It was found that gold was electroplated uniformly on the copper particles by the investigation of a gold-distribution image of the above obtained copper particles using a scanning electron microscope photo and an X-ray microanalyzer. Copper impurities in the solution remained 40 ppm after the plating.

Au/Cu particles that were obtained could be used as the material for electrical contacts.

EXAMPLE 3

Electroplaing was performed according to the following conditions employing 2 l of $Al_2O_3$ particles having an average size of 1 mm.

After degreased $Al_2O_3$ particles were washed by water, then by hydrochloric acid and again by water, chemical nickel plating was performed according to the following process.

| Sensitizing: | Stannous chloride solution | 2 l |
| --- | --- | --- |
| ↓ | | |
| Washing | | |
| ↓ | | |
| Activation: | palladium chloride solution | 2 l |
| ↓ | | |
| Washing | | |
| ↓ | | |
| Chemical nickel plating: | BEL nickel 5 l made by Uemura Kogyo K.K. (reducing agent; dimethylborazane) | |
| ↓ | | |
| Washing | | |

Electroplating of the nickel plated $Al_2O_3$ particles with platinum was performed employing the apparatus of FIG. 4 using a procedure similar to that of Example 2 and the following conditions.

| Platinum Plating Conditions | | |
| --- | --- | --- |
| Plating Solution: | Chloroplatinic acid | 10 g/l |
| | Hydrochloric acid | 0.3 N |
| Quantity of Plating Solution: | 50 l | |
| Current: | 200 A | |
| Voltage: | 20 V | |
| Plating Temperature: | 20° C. | |
| Plating Time: | 60 min. | |
| Flow Rate: | 0.2 cm/sec. | |

Each of the $Pt/Ni/Al_2O_3$ particles was found to have a uniform electroplated film. It was found that, according to this Example, particles having a uniform electroplated film could be obtained because the particles were in contact with the plating solution without fail.

When non-conductive particles are employed, chemical plating should be performed before electroplating. In accordance with the present invention, when the particles are first chemically plated, the film thickness applied need be thick enough only to perform the electroplating. Accordingly, the film thickness can be reduced so that the cost can be substantially reduced compared with the case in which highly conductive particles are obtained only by applying a chemical plating film.

EXAMPLE 4

Refining of gold was performed employing the same electrolytic cell of Example 1 except that the non-porous diaphragm made of Nafion (Trademark of Du Pont) 324 having sulfonic acid groups, and the cathode particles which were gramular carbon particles of sizes between 0.6 to 0.8 mm were employed.

The test solution containing the following components were prepared. The solution ws electrolyzed under

| Au | 5878 ppm | K | 2450 ppm |
| --- | --- | --- | --- |
| Cu | 57 ppm | Cl⁻ | 1065 ppm |
| Ni | 38 ppm | $SO_4$ | 1025 ppm |
| Fe | 84 ppm | TOC | 13.5 g/l | the same condition as those of Example 1. As a result, the electrolytic voltage ws about 2.4 V, the average current efficiency was 100%, and the concentration of the gold in the test solution at the outlet of the electrolytic cell was 5050 ppm.

Metals deposited on the cathode particles were dissolved by aqua regia for analysis of them and each metal's concentration was determined as follows by atomic absorption analysis.

| Au | 7080 ppm | Ni | less than 1 ppm |
| --- | --- | --- | --- |
| Cu | less than 1 ppm | Fe | less than 1 ppm |

Accordingly, the purity of gold (Au/Au+Cu+Ni+Fe) was raised from 96.3% to 99.99%.

EXAMPLE 5

This Example demonstrates the decomposition of cyanic compounds. The electrolytic cell of Example 1 was used in this Example except that the anode, the cathode and the cathode particles were made to be the cathode, the anode and anode particles, respectively. Graphite particles having a size between 0.4 to 0.8 mm and titanium coated with gold were employed as the anode particles and the cathode, respectively.

The test waste solution of Example 1 was employed as the test waste solution of this Example. The solution was diluted with water so that the concentration of the cyanide ion was adjusted to 640 ppm before it was supplied to the electrolytic cell.

The waste solution prepared in the above manner was supplied to the electrolytic cell at a flow rate of about 2.8 l/min, and was electrolyzed under the condition of an anode current density of 2.60 A/dm$^2$, a cathode current density of 1.0 A/dm$^2$, an inner-fluidized bed current concentration of 10.7 A/l of fluidized bed, and a fractional void of the fluidized bed of the graphite particles of 70%. As a result, the electrolytic voltage was between 2.1 to 2.5 V, the average current efficiency was 85%, and the concentration of the cyanide ions at the outlet of the electrolytic cell was 80 ppm.

What is claimed is:

1. In the process for electrolyzing an electrolyte by suppling electrolyte to a main electrode chamber, provided with an upper tower, of an electrolytic cell main body separated from an auxiliary electrode chamber of the electrolytic cell main body by a diaphragm, while maintaining main electrode particles in the fluidized state by the flow of said electrolyte through said main electrode chamber, and providing an electrolyzing potential across said cell; THE IMPROVEMENT COMPRISING: providing a porous auxiliary electrode in contact with said diaphragm on the side thereof facing said auxiliary electrode chamber, to facilitate flow of gas generated on the surface of the auxiliary electrode in the direction of said auxiliary chamber, said main electrode particles comprising carbon and being separated from electrolyte by virtue of said electrolyte being decelerated when it enters a tapered part of said upper tower.

2. The process as claimed in claim 1, wherein the main electrode chamber, the auxiliary electrode chamber, the main electrode particles and the auxiliary electrode are a cathode chamber, an anode chamber, cathode particles and an anode respectively.

3. The process as claimed in claim 2, wherein the electrolyte is a metal containing waste solution; the metal in the waste solution to be recovered is, by electrolysis, deposited on the cathode particles; and said metal coated cathode particles are recovered from said electrolytic cell.

4. The process as claimed in claim 2, wherein the electrolyte is a high purity metal containing solution; the metal in the solution to be refined is, by electrolysis, deposited on the cathode particles; and said metal coated cathode particles are recovered from said electrolytic cell.

5. The process as claimed in claim 2, wherein the electrolyte is a metal containing solution and the metal in the solution is electrically plated on the cathode particles.

6. The process as claimed in claims 2, wherein the cathode particles are particles selected from the group consisting of graphite and activated carbon, glass and ceramic, coated with a metal selected from the group consisting of gold, silver copper, nickel and lead.

7. The process as claimed in claim 1, wherein the electrolyte is a metal containing solution, and the metals contained in the solution are gold ions and/or gold cyanide complex ions.

8. The process as claimed in claim 1, wherein the electrolyte is a metal containing solution which is a gold electroplating waste solution or a gold etching waste solution.

9. The process as claimed in claim 3, wherein the material of the cathode particles is the same as the metal to be recovered from the waste solution.

10. The process as claimed in claim 1, wherein the main electrode chamber, the auxiliary electrode chamber, the main electrode particles and the auxiliary electrode are an anode chamber, a cathode chamber, anode particles and a cathode respectively, and an organic compound and/or a cyanic compound contained in the electrolyte which is an organic compound and/or cyanic compound containing solution are decomposed by electrolysis.

11. The process as claimed in claim 1, wherein the diaphragm is porous and the electrolysis is performed in the presence of a plurality of granules in the auxiliary electrode chamber.

12. The process as claimed in claim 1, wherein the diaphragm is non-porous and ion-permeable.

13. The process as claimed in claim 1, wherein the fluidized main electrode particles have a fractional void between about 40 to 90%.

14. The process as claimed in claim 1, wherein the auxiliary electrode has a current density up to 20 A/dm$^2$.

15. The process as claimed in claim 1, wherein the main electrode has a current density up to 30 A/dm$^2$.

16. The process as claimed in claim 1, wherein the current concentration in the fluidized bed is up to 30 A/l-fluidized bed.

* * * * *